United States Patent [19]  [11] 4,340,536
Beffa  [45] Jul. 20, 1982

[54] CHROME-COMPLEX DYES AND THE PRODUCTION AND USE THEREOF

[75] Inventor: Fabio Beffa, Riehen, Switzerland

[73] Assignee: Ciba-Geigy Corporation, Ardsley, N.Y.

[21] Appl. No.: 149,605

[22] Filed: May 14, 1980

[30] Foreign Application Priority Data

May 23, 1979 [CH] Switzerland ............... 4839/79
Apr. 28, 1980 [CH] Switzerland ............... 3265/80

[51] Int. Cl.³ ............... C09B 45/48; C09B 56/04
[52] U.S. Cl. ............... 260/145 A; 260/201;
260/202; 260/144; 260/203; 260/204; 260/145
B; 260/206; 260/207; 260/145 C; 260/146 R;
260/146 D; 260/147; 260/148; 260/149;
260/150; 260/151; 260/154; 260/155; 260/156;
260/158; 260/159; 260/160; 260/162; 260/163;
260/166; 260/167; 260/169; 260/173; 260/175;
260/176; 260/193; 260/194; 260/195; 260/196;
260/197; 260/198; 260/199; 260/200

[58] Field of Search ........... 260/145 R, 145 A, 145 B, 260/145 C, 148

[56] References Cited

U.S. PATENT DOCUMENTS 3,525,732  8/1970  Beffa et al. ............... 260/145 A
3,625,937 12/1971  Scholl ............... 260/145 B
3,925,346 12/1975  Buehler et al. ............... 260/145 A
4,033,942  7/1977  Beffa et al. ............... 260/145 B X Primary Examiner—Charles F. Warren
Attorney, Agent, or Firm—Edward McC. Roberts

[57] ABSTRACT

Chrome-complex dyes for dyeing natural and synthetic polyamide materials, which dyes, in the form of the free acid, correspond to the formula

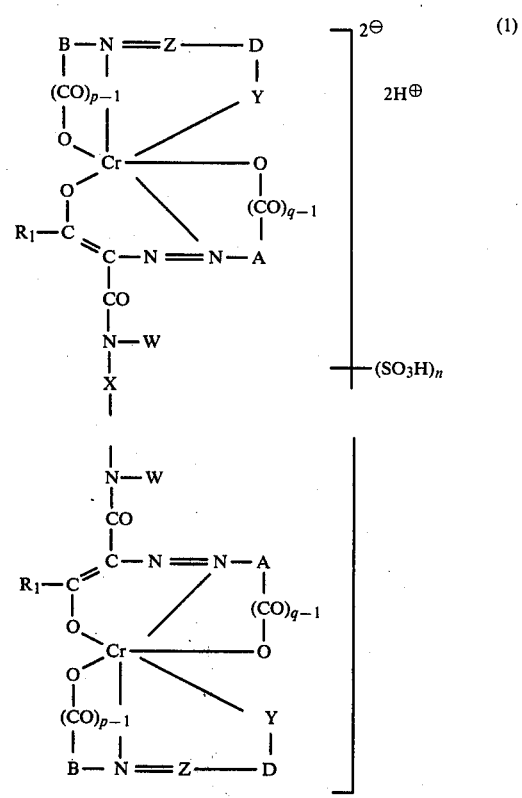

wherein X, W, R₁, A, q, p, B, Z, D, Y and n have the meanings defined in claim 1.

10 Claims, No Drawings

CHROME-COMPLEX DYES AND THE PRODUCTION AND USE THEREOF

The present application relates to chrome-complex dyes which, in the form of the free acid, correspond to the formula

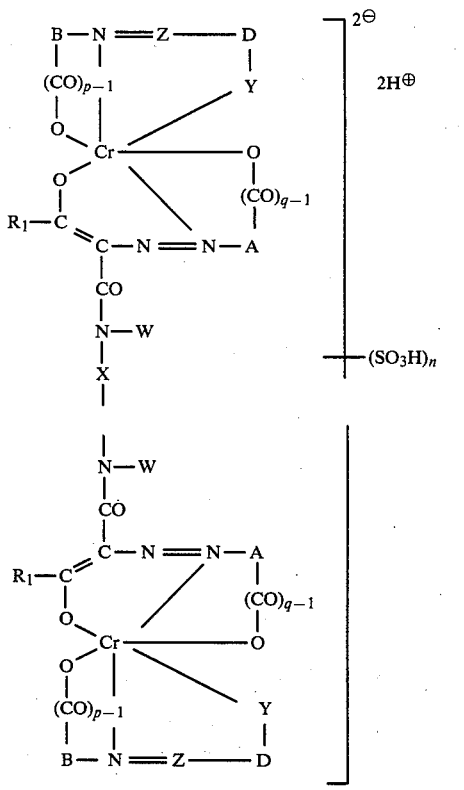

wherein X is a direct bond or the radical of an aliphatic, aromatic or heterocyclic diamine, W is hydrogen or a lower alkyl group, and the two radicals W can also be bound to one another so that together they form an aliphatic bridge having 2 C atoms, each $R_1$ is a low-molecular alkyl group, an aryl group or the $CN-CH_2$ group, the A s independently of one another are each a radical of the benzene or naphthalene series, the B s independently of one another are each a radical of the benzene of naphthalene series, the Z s independently of one another are each a nitrogen atom or a CH group, the p s independently of one another are each 1 or 2, the q s independently of one another are each 1 or 2, the Y s independently of one another are each an oxygen atom or a group of the formula $-NR-$, wherein R is hydrogen or low-molecular alkyl, and when Z is a CH group, Y has to be an oxygen atom and the D s independently of one another are each the radical of an o-hydroxyaldehyde, or, when Z is a nitrogen atom, they are each the radical of a coupling component coupling in the o-position with respect to Y, and n is an integer from 1 to 8 inclusive.

The term "low-molecular" denotes herein particularly groups having 1 to 5 C atoms.

By "aryl" are meant in particular phenyl and naphthyl groups, which are unsubstituted or substituted, for example by chlorine, methyl, methoxy, nitro or sulfo.

The bridge member X can be derived from the widest variety of diamines. It is for example an aliphatic group having 2 to 6 C atoms, such as an alkylene or cycloalkylene group, or an unsubstituted or substituted alkenylene group, a radical of the benzene or naphthalene series or a radical of the formula

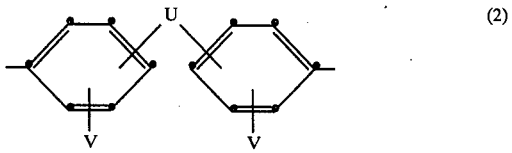

wherein U is a direct bond, an unsubstituted or substituted methylene bridge, or a bridge of the formula $-O-$, $-S-$, $-NR'-$, $-SO-$, $-SO_2-$, $-CO-$, $-CO-CO-$, $-CO-NH$, $-NH-CO-NH-$, $-NH-CS-NH-$, $-SO_2-NH-$, $-SO_2-NH-SO_2$, $-N=N-$, $-CH_2-CH_2-$ or $-CH=CH-$, wherein R' is hydrogen or low-molecular alkyl, and the V s independently of one another are each hydrogen or a substituent. The following may be given as examples of substituted methylene bridges:

$-C(CH_3)_2-$,

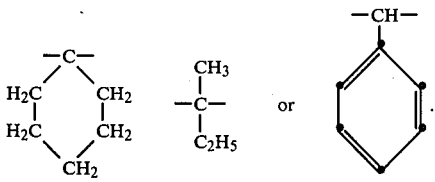

Possible V groups are, in addition to hydrogen, in particular the sulfo and carboxyl group, halogen, especially chlorine, as well as low-molecular alkyl and alkoxy.

The radicals A and B can contain one or more sulfo groups and can also be further substituted, for example by low-molecular alkyl, alkoxy, sulfonamido, N-mono- or N,N-di-substituted sulfonamido groups and sulfone groups, chlorine, bromine, nitro, cyano, arylazo, particularly phenylazo, sulfophenylazo or sulfonaphthylazo and arylazoaryleneazo, such as sulfophenylazophenyleneazo or sulfonaphthylazophenyleneazo. Sulfone groups are in particular low-molecular alkylsulfonyl groups which are unsubstituted or substituted, for example by chlorine or hydroxyl, and the substituents of the sulfonamide groups are preferably likewise low-molecular alkyl groups which are unsubstituted or substituted, for example by hydroxyl. The radical $-D-Y-$ is derived in particular from the following coupling components: phenols, naphthols, naphthylamines, pyrazolones, pyrazoleimines, pyridones as well as acetoacetic acid amides, especially acetoacetic acid anilides, and also barbituric acid derivatives and hydroxyquinolines.

The present application relates in particular to compounds of the formula (1) in which Y is an oxygen atom or the NH group and Z is a nitrogen atom.

Dyes preferred on account of their easy accessibility are also dyes wherein the radicals $R_1$ are each a methyl group.

Of special interest are chrome-complex dyes which, in the form of the free acid, correspond to the formula

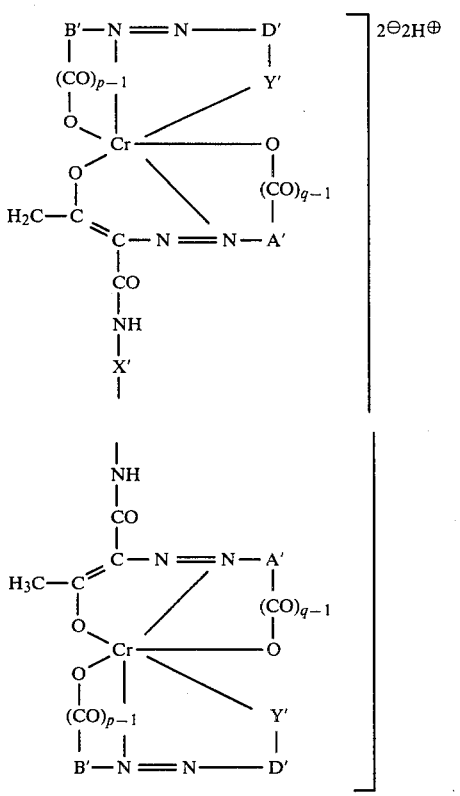

$$2^{\ominus}2H^{\oplus} \quad (3)$$

wherein X' is a low-molecular alkylene group, a phenylene or naphthylene group which is unsubstituted or substituted by chlorine, nitro, sulfo, low-molecular alkyl or alkoxy, or X' is a radical of the formula

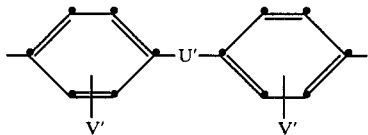

(4)

wherein U' is a direct bond or a bridge member of the formula

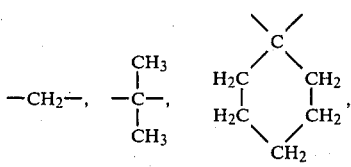

—CH=CH—, —SO$_2$—, —O— or —SO$_2$—NH—SO$_2$— and the V' s independently of one another are each hydrogen, the sulfo group, chlorine, methyl or methoxy, the Y' s independently of one another are each an oxygen atom or the NH group, p and q independently of one another are each 1 or 2, A' and B' independently of one another are each a phenyl or naphthyl group which is unsubstituted or substituted by sulfo, alkyl or alkoxy groups, or by chlorine, nitro or cyano, and the D' s independently of one another are each a phenyl group which is unsubstituted or substituted by hydroxyl, alkyl or alkoxy, or are each a naphthyl group which is unsubstituted or substituted by amino, acylamino or sulfo, or are each the radical of a 1-aryl-3-methylpyrazol-5-one, or the radical of an acetoacetic acid anilide, the two last-mentioned radicals being able to be substituted by sulfo, nitro, chlorine, bromine, alkyl or alkoxy.

By "alkyl" and "alkoxy" are meant in this case low-molecular radicals. The term "acylamino" denotes low-molecular alkanoylamino, alkylsulfonylamino and alkoxycarbonylamino radicals as well as aroylamino and arylsulfonylamino radicals; and the term "aryl" includes in particular naphthyl, naphthyl substituted by 1 to 3 sulfo groups, as well as in particular phenyl, and phenyl substituted by chlorine, bromine, methyl, ethyl, methoxy, nitro or sulfo.

The novel compounds are produced by reacting a dye of the formula

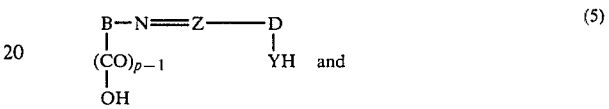

(5)

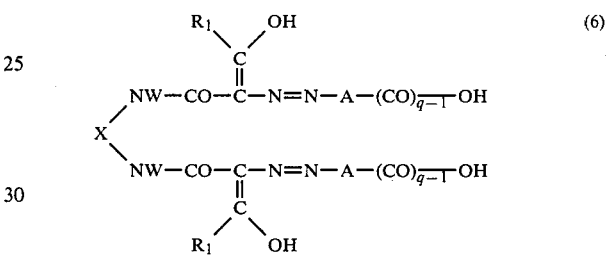

(6)

wherein X, W, R$_1$, A, B, D, Z, Y, p and q have the same meanings as in the formula (1), with a chromium-releasing agent to give the 1:1-chrome complex in the case of the formula (5), and the chrome complex containing 2 atoms of chromium per molecule in the case of the formula (6), respectively, and subsequently reacting the resulting chrome complexes with the non-metallised dye of the formulae (6) and (5), respectively, the starting compounds being so chosen that the chrome complex contains 1 to 8 sulfo groups.

Preferably, the 1:1-chrome complex of the dye of the formula (5) is firstly produced, and this complex is then reacted with the compound of the formula (6) in the ratio 2:1.

The starting dyes of the formula (5) are produced in the customary manner. When Z is a nitrogen atom, an amine of the formula

$$HO—(CO)_{\overline{p-1}}B—NH_2 \quad (9)$$

is diazotised, and the diazotized product is coupled to a coupling component of the formula

$$H—D—YH \quad (10)$$

Suitable diazo components of the formula (9) are for example: anthranilic acid, 4- or 5-sulfo- and 4- or 5-sulfonamidoanthranilic acid, 2-amino-1-hydroxybenzene, 4-chloro- and 4,6-dichloro-2-amino-1-hydroxybenzene, 4- or 5-nitro-2-amino-1-hydroxybenzene, 4-chloro- and 4-methyl- and 4-acetylamino-6-nitro-2-amino-1-hydroxybenzene, 6-acetylamino- and 6-chloro-4-nitro-2-amino-1-hydroxybenzene, 4-cyano-2-amino-1-hydroxybenzene, 4-methoxy-2-amino-1-hydroxybenzene, 2-amino-1-hydroxybenzene-5-methyl- and -5-benzylsulfone, 2-amino-1-hydroxybenzene-4-methyl-, -ethyl-, -chloromethyl- and -butylsulfone, 5-nitro- and 6-nitro-2-amino-1-hydroxybenzene-4-methylsulfone, 2-amino-1-hydroxybenzene-4- or -5-sulfamide, -sulfo-N-methyl- and -sulfo-N-β-hydroxyethylamide, 2-amino-1-hydroxybenzo-4-sulfanilide, 4-methoxy-5-chloro-2-amino-1-hydroxybenzene, 4-methyl-2-amino-1-hydroxybenzene, 4-chloro-5-nitro-2-amino-1-hydroxybenzene, 3,4,6-trichloro-2-amino-1-hydroxybenzene, 6-acetylamino-4-chloro-2-amino-1-hydroxybenzene, 4,6-dinitro-2-amino-1-hydroxybenzene, 4-nitro-2-amino-1-hydroxybenzene-6-sulfonic acid amide, 2-amino-1-hydroxybenzene-4- or -5-sulfananthranilide, 2-amino-1-hydroxybenzene-4- or -5-sulfonic acid, 4-nitro-2-amino-1-hydroxybenzene-6-sulfonic acid, 5-nitro- or 6-nitro-2-amino-1-hydroxybenzene-4-sulfonic acid, 4-chloro-2-amino-1-hydroxybenzene-6-sulfonic acid, 1-amino-2-hydroxy-naphthalene-4-sulfonic acid, 1-amino-2-hydroxy-6-nitronaphthalene-4-sulfonic acid, 4-(4'- or 3'-sulfophenylazo)-2-amino-1-hydroxybenzene, 4-(3'-sulfonamidophenylazo)-2-amino-1-hydroxybenzene, 4-(4'-phenylazophenyleneazo)-2-amino-1-hydroxybenzene and 2-amino-1-hydroxybenzene-4,6-disulfonic acid.

Also suitable in place of the stated amines of the formula (9) as diazo components are corresponding methoxy compounds, such as anisidine, 4- or 5-chloroanisidine, 4- or 5-nitroanisidine or anisidine-4- or -5-sulfonic acid, the methoxy group on chroming being converted into an OH group.

Compounds of particular interest are those wherein B or B' is a phenyl or naphthyl group containing nitro and/or sulfo groups.

The radical D or D' is derived in particular from the following groups of coupling components:

naphthols which are unsubstituted or substituted by chlorine, acylamino, amino, sulfo, sulfonamido, N-mono- or N,N-disubstituted sulfonamido groups and sulfone groups, these groups having the same meanings as given in the foregoing;

naphthylamines which are unsubstituted or substituted by sulfo, sulfonamido, mono- or disubstituted sulfonamido or sulfone groups;

5-pyrazolones or 5-aminopyrazoles which contain in the 1-position preferably a phenyl or naphthyl group which is unsubstituted or substituted by chlorine, nitro, lowmolecular alkyl and alkoxy groups, sulfonamido, N-alkylated sulfonamido groups, sulfone or in particular sulfo groups;

acetoacetic acid anilides and bezoylacetic acid anilides which can be substituted in the anilide nucleus by chlorine, bromine, low-molecular alkyl, alkoxy, sulfone, sulfonamide, N-mono- or N,N-disubstituted sulfonamido groups and sulfo groups;

phenols which are substituted by low-molecular acylamino groups and/or by alkyl groups containing preferably 1 to 5 C atoms, and which couple in the o-position;

2,6-dihydroxy-3-cyano- or -carbonamido-4-alkylpyridines and 6-hydroxy-2-pyridones, which are substituted in the 1-position by low-molecular unsubstituted or substituted alkyl, for example methyl, isopropyl, β-hydroxyethyl, β-aminoethyl or γ-isopropoxypropyl, which carry in the 3-position a cyano or carbonamido group and in the 4-position a low-molecular alkyl group, particularly methyl;

barbituric acid, and barbituric acids substituted on the nitrogen atoms by low-molecular alkyl or aryl, especially phenyl; and dihydroxyquinolines.

Examples of coupling components of these types are: 2-naphthol, 1,3- or 1,5-dihydroxynaphthalene, 2-naphthol-6-sulfonamide, 2-naphthol-6-β-hydroxyethylsulfone, 1-naphthol, 1-acetylamino-7-naphthol, 1-propionylamino-7-naphthol, 1-carbomethoxyamino-7-naphthol, 1-carboethoxy-amino-7-naphthol, 1-carbopropoxyamino-7-naphthol, 1-dimethylaminosulfonylamino-7-naphthol, 6-acetyl-2-naphthol, 2-naphthol-3-, -4-, -5-, -6-, -7- or -8-sulfonic acid, 1-naphthol-3-, -4- or -5-sulfonic acid, 4-methyl-1-naphthol, 4-methoxy-1-naphthol, 4-acetyl-1-naphthol, 1-naphthol-3-, -4- or -5-sulfonamide, 2-naphthol-3-, -4-, -5-, -6-, -7- or -8-sulfonamide, 5,8-dichloro-1-naphthol, 5-chloro-1-naphthol, 2-naphthylamine, 2-naphthylamine-1-sulfonic acid, 1-naphthyl-amino-4- or -5-sulfonic acid, 2-aminonaphthalene-7-sulfonic acid, 1-naphthylamino-4-sulfonamide, 2-aminonaphthalene-6-sulfonamide, 2-phenylaminonaphthalene, 2-(3'-chlorophenyl)aminonaphthalene, 2-aminonaphthalene-6-sulfonic acid-N-methylamide or -6-sulfonic acid, 1,3-dimethylpyrazol-5-one, 3-methylpyrazol-5-one, 1-phenyl-3-methylpyrazol-5-one, 1-phenyl-5-pyrazolone-3-carboxylic acid amide, 1-(2'-, 3'- or 4'-methylphenyl)-3-methylpyrazol-5-one, 1-[3'- or 4'-(β-hydroxyethylsulfonyl)-phenyl]-3-methylpyrazol-5-one, 1-(2',3'- or 4'-sulfophenyl)-3-methylpyrazol-5-one, 1-(2'-chloro-5'-sulfophenyl)-3-methylpyrazol-5-one, 1-(2'- or 4'-methoxyphenyl)-3-methylpyrazol-5-one, 1-(2'-, 3'- or 4'-chlorophenyl)-3-methylpyrazol-5-one, 1-(2'-, 3'- or 4'-nitrophenyl)-3-methylpyrazol-5-one, 1-(2',5'- or 3', 4'-dichlorophenyl)-3-methylpyrazol-5-one, 1-(2'-, 3'- or 4'-sulfamoylphenyl)-3-methylpyrazol-5-one, 1-(2', 5'-dichloro-4'-sulfophenyl)-3-methylpyrazol-5-one, 1-(2'-, 3'- or 4'-methylsulfonylphenyl)-3-methylpyrazol-5-one, 1-(2'-, 3'- or 4'-sulfophenyl)-3-methyl-5-aminopyrazole, 1-(2'-chloro-5'-sulphonyl)-3-methyl-5-aminopyrazole, acetoacetanilide, acetoacetanilide-4-sulfonic acid, acetoacet-o-anisidine, acetoacet-o-toluidine, acetoacet-o-chloroanilide, acetoacetoanilide-3- or -4-sulfonamide, acetoacet-m-xylidide, tetralol, 4-methylphenol, 3-dialkylaminophenol, particularly 3-dimethylamino- and 3-diethylaminophenol, 4-butylphenol, 4-amylphenol, especially 4-t-amylphenol, 2-isopropyl-4-methylphenol, 2- or 3-acetylamino-4-methylphenol, 2-methoxycarbonylamino-4-methylphenol, 2-ethoxycarbonylamino-4-methylphenol and 3,4-dimethylphenol, resorcinol, 2,6-dihydroxy-3-cyano-4-methylpyridine, 1-methyl-3-cyano-4-ethyl-6-hydroxypyridone, 1-amino-3-cyano-4-methyl-6-hydroxypyridone, 1-phenyl-3-carbonamido-4-methyl-6-hydroxypyridone, barbituric acid and 2,4-dihydroxyquinoline.

D or D' is preferably a naphthyl group which is unsubstituted or substituted by sulfo or amino and sulfo, or it is a phenyl group which is unsubstituted or substituted by low-molecular alkyl, or it is the radical of a 1-phenyl- or 1-sulfophenyl-3-methyl-pyrazol-5-one.

If Z is a —CH— group, an amine of the formula (9) is reacted with an o-hydroxybenzaldehyde or o-hydroxynaphthaldehyde. Suitable aldehydes are for example: 2-hydroxy-1-naphthaldehyde, 1-hydroxy-2-naphthaldehyde, 2-hydroxybenzaldehyde, 3- and 5-methyl-2-hydroxybenzaldehyde, 3,5-dimethyl-2-hydroxybenzaldehyde, 5-butyl-2-hydroxybenzaldehyde, 5-chloro- or 5-bromo-2-hydroxybenzaldehyde, 3-chloro-2- hydroxybenzaldehyde, 3,5-dichloro-2-hydroxybenzaldehyde, 5-sulfo-2-hydroxybenzaldehyde and 3-methyl-5-chloro-2-hydroxybenzaldehyde, as well as the aldehydes derivable therefrom and substituted by arylazo or arylazoaryleneazo.

The compounds of the formula (6) are obtained using methods known per se, for example by bis-condensing on a diamine of the formula

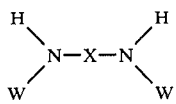
(11)

both amino groups with diketene or with a keto ester, and coupling to the intermediate obtained 2 equivalents of a diazotised amine of the formula

(12)

Suitable amines of the formula (12) are the same compounds as those listed as amines of the formula (9).

Suitable diamines of the formula (11) are for example: hydrazine, N,N'-dimethylhydrazine, ethylenediamine, propylenediamine, 1,4-diaminocyclohexane, diaminomalonitrile, piperazine, 1,5-naphthylenediamine, m- or p-phenylenediamine, 1,4-phenylenediamine-2-sulfonic acid, 1,3-phenylenediamine-4-sulfonic acid, 4-methyl- or 4-methoxy-1,3-phenylenediamine, 2-methoxy- or 2-nitro-1,4-phenylenediamine, 4,4'-diaminodiphenyl, 2,2'-diaminodiphenyl-4,4'-disulfonic acid, 4,4'-diaminodiphenyl-3-sulfonic acid, 4,4'-diaminodiphenyl-2,2'- or 3,3'-disulfonic acid, 4,4'-diamino-3,3'-dimethoxydiphenyl, 4,4'-diamino-3,3'- or 2,2'-dimethyldiphenyl, 3,3'- or 4,4'-diaminodiphenylsulfone, 4,4'-diaminobenzophenone, 4,4'-diaminodiphenyl ether, 4,4'-diaminodiphenyl sulfide, 4,4'-diaminodiphenyl sulfoxide, 4,4'-diaminodiphenyl-2-sulfonic acid, 4,4'-diaminobenzil, 3,3'- or 4,4'-diaminobenzanilide, 3,3'-diaminobenzanilide-4-sulfonic acid, 4,4'-diaminobenzanilide-3-sulfonic acid, 3,3'- or 4,4'-diaminodiphenylurea, 4,4'-diaminodiphenylurea-3,3'-disulfonic acid, 4,4'-diaminodiphenylthiourea, 4,4'-diaminobenzene-sulfanilide, 3,3'- or 4,4'-diaminodiphenyldisulfimide, 4,4'-dichloro-3,3'-diaminodiphenyldisulfimide, 4,4'-diaminoazobenzene, 4,4'-diaminostilbene-2,2'-disulfonic acid, 4,4'-diaminodiphenylmethane, 4,4'-diamino-3,3'-dimethyl-diphenylmethane, 3,3'-diamino-4,4'-dimethyldiphenylmethane, 4,4'-diaminotriphenylmethane, 4,4'-diaminodiphenylethane, 4,4'-diamino-3,3'-dimethyl-bis-phenylethane, 2,2-bis-(4'-aminophenyl)propane, 1,1-bis-(4'-aminophenyl)-cyclohexane and 1,1-bis-(4'-amino-3'-methyl-phenyl)-cyclohexane.

The starting products are preferably so selected that the finished complex contains 2 to 6 sulfo groups.

The chrome complex of the compound of the formula (5) or (6) is produced by known customary methods, for example by reacting the respective compound, in an acid medium, with a simple or complex salt of trivalent chromium, such as chromium formiate, chromium sulfate, chromium chloride-hexahydrate or chromium fluoride, at boiling temperature or optionally at temperatures exceeding 100° C. Trivalent chromium can also be produced in the reaction mixture from chromium-VI compounds, for example chromate, if a reducing agent is simultaneously added. The metallising process can be performed in an aqueous or organic-aqueous medium, or in purely organic solvents, such as alcohols or ketones, if necessary with the addition of solubility-promoting agents or substances accelerating chroming, for example complexing agents.

The reaction of the chrome complex of the dye of the formulae (5) and (6) with the metal-free dye of the formulae (6) and (5), respectively, is performed advantageously in a neutral to weakly alkaline medium, in an open or closed vessel, at elevated temperature, for example at temperatures between 50° and 120° C. The reaction can be carried out in organic solvents, for example in alcohols or ketones, or in an aqueous solution, where additions of solvents, such as alcohols, formamide, and so forth, can if required promote the reaction. It is in general advisable to react as far as possible stoichiometric amounts of the chromium-containing complex and of the metal-free dye with each other. An excess of metal-containing dye is as a rule less disadvantageous than an excess of metal-free dye.

Instead of using a homogeneous chrome complex, it is also possible to use a mixture of various chrome complexes.

The novel chromium-containing mixed complexes obtainable by the above process are advantageously isolated in the form of their salts, particularly in the form of alkali salts, such as lithium, potassium and especially sodium salts, and also ammonium salts. They are suitable for dyeing the widest range of natural or synthetic polyamide materials, such as wool, silk, synthetic polyamide fibres or polyurethane, especially however for the dyeing of leather. Depending on constitution, they are also suitable for dyeing cellulose-containing materials, for example cotton and paper.

The novel dyes are deeply coloured and cover well. The have good substantivity with at the same time good fastness properties, such as fastness to washing, water, perspiration, rubbing, diffusion, light, acids and alkalies. Meriting special mention are the good build-up properties on various types of leather, both on pure chrome leather and on leather re-tanned with vegetable or synthetic tanning substances. Full yellow-orange to brown and olive shades are obtained.

Where not otherwise stated in the following Examples, 'parts' are parts by weight, percentages are percent by weight, and the temperature values are in degrees Centigrade.

EXAMPLE 1

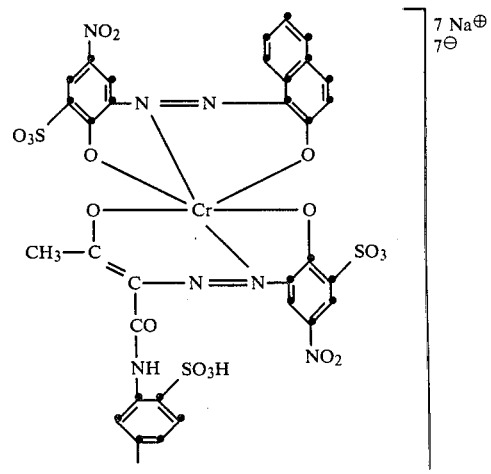

-continued

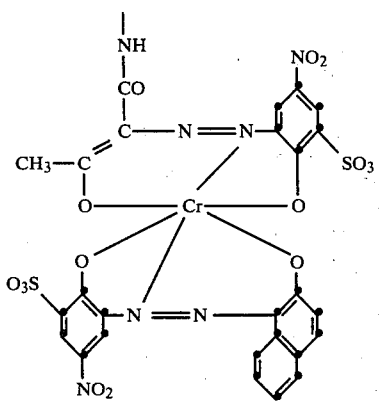

In 1000 parts by volume of water are suspended 43.9 parts of the complex chrome compound of the type 1 atom of chromium:1 molecule of dye, which compound corresponds to 5.2 parts of chromium and 38.9 parts of monoazo dye formed from diazotised 4-nitro-2-amino-1-hydroxybenzene-6-sulfonic acid and 2-hydroxynaphthalene, with 42.3 parts of the bis-coupling product from diazotised 4-nitro-2-amino-1-hydroxybenzene-6-sulfonic acid and 1,3-bisacetoacetylaminobenzene-4-sulfonic acid (obtained by reaction of diketene with 1,3-diaminobenzene-4-sulfonic acid). The mixture is heated to 80° to 85° and simultaneously the pH value of the suspension is raised to 7 to 7.5 by the addition of 5 N sodium hydroxide solution, and the mixture is held at this temperature, the pH value being kept constant by further addition of 5 N sodium hydroxide solution, until the starting products have disappeared. The novel chromium-containing dye is isolated by concentrating the mixture by evaporation and by spray drying. The product after drying is in the form of a dark powder, which dissolves in water to give a brown colour and dyes leather in brown shades.

EXAMPLE 2

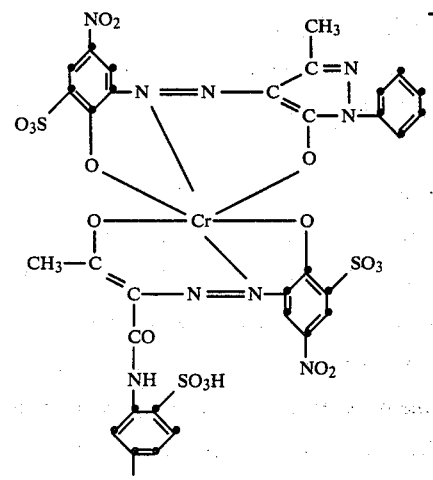

-continued

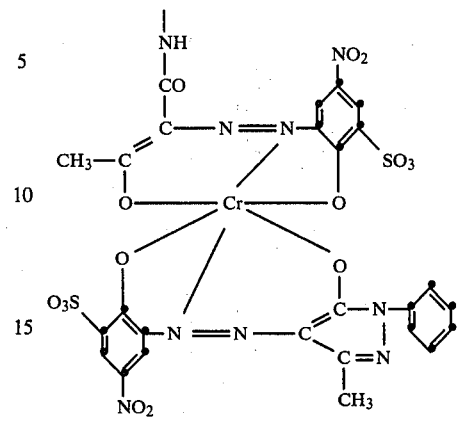

In 1000 parts by volume of water are suspended 46.9 parts of the complex chrome compound of the type 1 atom of chromium:1 molecule of dye, which corresponds to 5.2 parts of chromium and 41.9 parts of monoazo dye formed from diazotised 4-nitro-2-amino-1-hydroxybenzene-6-sulfonic acid and 1-phenyl-3-methyl-5-pyrazolone, with 42.3 parts of the bis-coupling product from diazotised 4-nitro-2-amino-1-hydroxybenzene-6-sulfonic acid and 1,3-bisacetoacetylaminobenzene-4-sulfonic acid (obtained from reaction of diketene with 1,3-diaminobenzene-4-sulfonic acid). The mixture is heated to 80° to 85° and the pH value of the suspension is simultaneously raised to 7 to 7.5 by the addition of 5 N sodium hydroxide solution, and this temperature is maintained and the pH value held constant by further addition of 5 N sodium hydroxide solution until the starting products have disappeared. The novel, chromium-containing dye is isolated by concentration by evaporation and then spray drying. The product after drying is in the form of a dark powder, which dissolves in water to give an orange colour and dyes leather in orange shades.

EXAMPLE 3

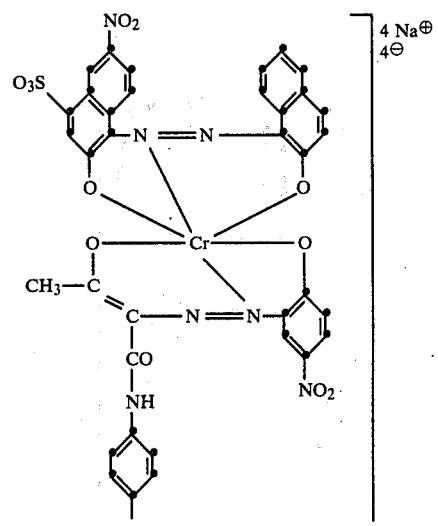

-continued

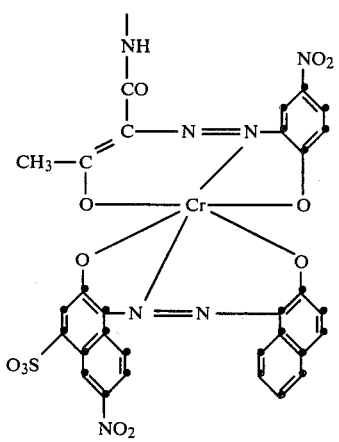

In 750 parts by volume of ethylene glycol are suspended 48.9 parts of the complex chrome compound of the type 1 atom of chromium: 1 molecule of dye, which corresponds to 5.2 parts of chromium and 43.9 parts of monoazo dye formed from diazotised 6-nitro-1-amino-2-hydroxynaphthalene-4-sulfonic acid and 2-hydroxynaphthalene, with 30.3 parts of the coupling product from diazotised 4-nitro-2-amino-1-hydroxybenzene and 1,4-bisacetoacetylaminobenzene (obtained by reaction of diketene with 1,4-diaminobenzene). The mixture is heated to 80° to 85° and the pH value of the suspension is simultaneously raised to 7 to 7.5 by the addition of 5 N sodium hydroxide solution; this temperature is maintained and the pH value is held constant by further addition of 5 N sodium hydroxide solution until the starting products have disappeared. The novel, chromium-containing dye is precipitated by the addition of sodium chloride solution; the dye is filtered off and subsequently dried; it is then in the form of a dark powder, which dissolves in water to give a brown colour, and dyes leather, from a weakly acid bath, in fast brown shades.

EXAMPLE 4

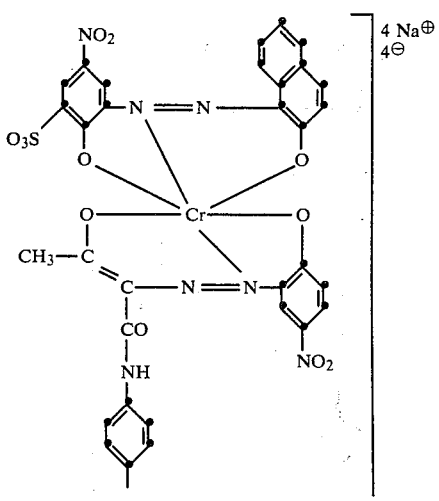

-continued

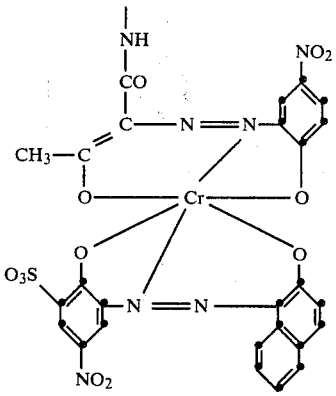

In 750 parts by volume of ethylene glycol are suspended 43.9 parts of the complex chrome compound of the type 1 atom of chromium: 1 molecule of dye, which corresponds to 5.2 parts of chromium and 38.9 parts of monoazo dye formed from diazotised 4-nitro-2-amino-1-hydroxybenzene-6-sulfonic acid and 2-hydroxynaphthalene, with 30.3 parts of the bis-coupling product from diazotised 4-nitro-2-amino-1-hydroxybenzene and 1,4-bisacetoacetylaminobenzene (obtained by reaction of diketene with 1,4-diaminobenzene). The mixture is heated to 80° to 85° and the pH value of the suspension is simultaneously raised to 7 to 7.5 by the addition of 5 N sodium hydroxide solution; this temperature is then maintained and the pH value is held constant by further addition of 5 N sodium hydroxide solution until the starting products have disappeared. The novel, chromium-containing dye is precipitated by the addition of sodium chloride solution, and is subsequently filtered off and dried. After drying, the dye is in the form of a dark powder, which dissolves in water to give a brown colour and dyes leather, from a weakly acid bath, in fast brown shades.

Dyes having similar properties are obtained by reacting the 1:1-chrome complex of the compound given in column III of the following Table, in the ratio of 2:1, with the coupling product from 2 equivalents of the respective diazo component shown in column II and 1 equivalent of the respective coupling component given in column I. These dyes dye leather in the respective shade listed in column IV.

| No. | I | II | III | IV |
|---|---|---|---|---|
| 1. |  NH—CO—CH₂—CO—CH₃ on both positions of phenylene | 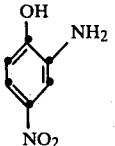 2-amino-4-nitrophenol | 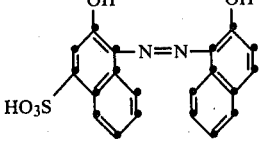 | brown |
| 2. | " | " | 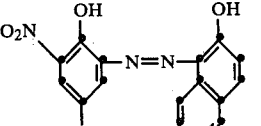 | brown |
| 3. | " | " | 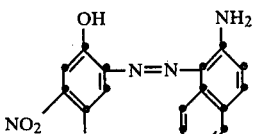 | olive |
| 4. | " | " | 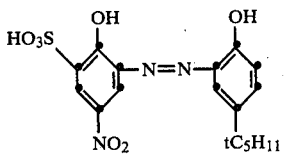 | brown |
| 5. | " | " | 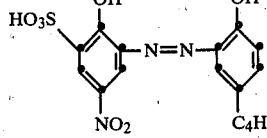 | brown |
| 6. | " | " | 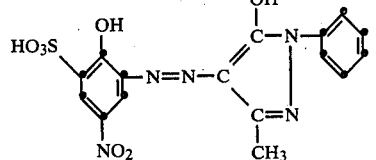 | orange |
| 7. | " | " | 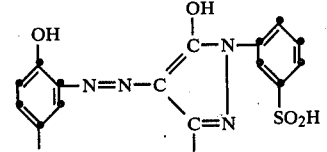 | orange |
| 8. | " | " | 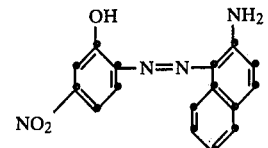 | olive |

-continued

| No. | I | II | III | IV |
|---|---|---|---|---|
| 9. | " | " | (OH, HO2S, SO3H, NO2, NH2 naphthalene azo structure) | very dark olive |
| 10. | " | HO3S–(OH, NH2, NO2)–phenyl | (HO3S, OH, NO2)–N=N–(OH)–naphthyl | brown |
| 11. | " | " | (O2N, OH, SO3H)–N=N–(OH)–naphthyl | brown |
| 12. | " | " | (HO3S, OH, NO2)–N=N–C(...)–pyrazolone–phenyl, CH3 | orange |
| 13. | NH–CO–CH2–CO–CH3 / SO3H / NH–CO–CH2–CO–CH3 (phenyl) | OH, NH2, NO2 (phenyl) | (HO3S, OH, NO2)–N=N–(OH)–naphthyl | brown |
| 14. | " | " | (OH, NO2)–N=N–(OH, SO3H)–naphthyl | brown |
| 15. | " | " | (HO3S, OH, NO2)–N=N–C(...)–pyrazolone–phenyl, CH3 | orange |
| 16. | " | " | (OH, NO2)–N=N–(NH2, SO3H)–naphthyl | olive |

-continued

| No. | I | II | III | IV |
|---|---|---|---|---|
| 17. | " | " | (structure: 2-hydroxy-5-nitrophenylazo pyrazolone with phenyl-SO₃H and CH₃) | orange |
| 18. | " | " | (structure: HO₃S, NO₂-substituted naphthol azo naphthol) | brown |
| 19. | " | " | (structure: HO₃S, OH, NO₂-phenyl azo OH, tC₅H₁₁-phenyl) | brown |
| 20. | (structure: bis(NH—CO—CH₂—CO—CH₃) linked by SO₂) | (structure: OH, NH₂, SO₃H aminophenol) | (structure: HO₃S, OH, NO₂-phenylazo pyrazolone with phenyl and CH₃) | orange |
| 21. | " | (structure: HO₃S, OH, NH₂, NO₂ aminophenol) | (structure: OH, NO₂-phenylazo pyrazolone with phenyl-SO₃H and CH₃) | orange |
| 22. | (structure: bis(NH—CO—CH₂—CO—CH₃) phenyl linked by SO₂—NH—SO₂) | " | " | orange |
| 23. | " | " | (structure: HO₃S, OH, NO₂-phenylazo pyrazolone with phenyl and CH₃) | orange |
| 24. | (structure: bis(NH—CO—CH₂—CO—CH₃) phenyl linked by O) | " | " | orange |

-continued

| No. | I | II | III | IV |
|-----|---|----|----|----|
| 25. | " | | (structure: 2-hydroxy-5-nitrophenyl azo pyrazolone with N-phenyl-SO₃H and CH₃) | orange |
| 26. | HO₃S—C₆H₃(—NH—CO—CH₂—CO—CH₃)—CH=CH—C₆H₃(SO₃H)(—NH—CO—CH₂—CO—CH₃) | 2-amino-4-nitrophenol (OH, NH₂, NO₂) | (bis-azo structure: HO₃S, OH / N=N / OH, SO₃H, NH₂, NO₂) | olive |
| 27. | " | " | (structure: O₂N, OH, CH₃-phenyl azo pyrazolone with OH, N-phenyl-SO₃H, CH₃) | reddish orange |
| 28. | " | " | (structure: HO₃S, OH-phenyl-NO₂ azo, C—CH₃(OH), CO—NH—phenyl) | brownish yellow |
| 29. | " | " | (4-nitro-2-hydroxyphenyl azo 2-hydroxynaphthalene) | olive |
| 30. | " | " | (4-chloro-2-hydroxyphenyl azo 2-hydroxynaphthalene) | brown |
| 31. | " | " | (O₂N, OH, SO₃H-phenyl azo 2-hydroxynaphthalene) | brown |
| 32. | " | " | (HO₃S, OH, NO₂-phenyl azo OH, C₄H₉-phenyl) | light brown |

-continued

| No. | I | II | III | IV |
|---|---|---|---|---|
| 33. | " | " | (structure: HO₃S, OH, NO₂ on benzene, N=N, naphthol with OH) | brown |
| 34. | " | " | (structure: OH, NO₂ on benzene, N=N, naphthol with OH) | brown |
| 35. | " | " | (pyrazolone structure with HO₃S, OH, NO₂-phenyl-N=N-, OH, N-phenyl, CH₃) | orange |
| 36. | " | " | (pyrazolone structure with OH, NO₂-phenyl-N=N-, OH, N-phenyl-SO₃H, CH₃) | brownish orange |
| 37. | " | " | (structure: OH, HO₃S on naphthol, N=N, naphthol with OH) | olive |
| 38. | " | " | (structure: OH, NO₂ on benzene, N=N, naphthol with NH₂ and SO₃H) | olive |
| 39. | " | " | (structure: HO₃S, OH, NO₂ on benzene, N=N, phenol with OH, tC₅H₁₁) | light brown |
| 40. | " | " | (structure: OH, HO₃S, NO₂ on naphthol, N=N, naphthol with OH) | olive-brown |
| 41. | (structure: phenylene bis(NH—CO—CH₂—CO—CH₃)) | (structure: HO₃S, OH, NH₂, NO₂ on benzene) | (structure: OH, NO₂ on benzene, N=N, naphthol with OH) | brown |

-continued

| No. | I | II | III | IV |
|---|---|---|---|---|
| 42 | " | " | (naphthalene with OH, HO₃S, NO₂; N=N; naphthol) | dark brown |
| 43 | " | " | (naphthalene with OH, HO₃S; N=N; naphthol) | brown |
| 44 | " | " | (phenol with OH, NO₂; N=N; phenol with OH, C₄H₉t) | brown |
| 45 | " | " | (phenol with HO₃S, OH, NO₂; N=N; phenol with OH, C₄H₉t) | brown |
| 46 | " | " | (phenol with OH, NO₂; N=N; phenol with OH, 2 CH₃) | brown |
| 47 | HO₃S–C₆H₃(NH–CO–CH₂–CO–CH₃)–CH=CH–C₆H₃(SO₃H)(NH–CO–CH₂–CO–CH₃) | OH, NH₂, NO₂ (phenol) | (phenol with OH, NO₂; N=N; phenol with OH, 2 CH₃) | brown |
| 48 | C₆H₄(NH–CO–CH₂–CO–CH₃)₂ | O₂N, OH, NH₂, SO₃H (phenol) | (phenol with OH, NO₂; N=N; naphthol) | violet-tinged brown |

-continued

| No. | I | II | III | IV |
|-----|---|----|----|----|
| 49 | " | " | (2-hydroxy-4-nitrophenyl)azo-(2-hydroxy-5-tert-butylphenyl) | reddish-brown |
| 50 | " | " | 1-(2-hydroxy-3-sulfo-6-nitro-naphth-1-yl)azo-2-hydroxynaphthalene | brown |
| 51 | " | " | 1-(2-hydroxy-4-sulfo-naphth-1-yl)azo-2-hydroxynaphthalene | violet-tinged brown |
| 52 | " | " | 1-(2-hydroxy-3-sulfo-5-nitrophenyl)azo-2-hydroxynaphthalene | brown |
| 53 | " | " | 1-(2-hydroxy-3-nitro-5-sulfophenyl)azo-2-hydroxynaphthalene | violet-tinged brown |
| 54 | " | " | 1-(2-hydroxy-6-nitro-4-sulfonaphth-1-yl)azo-2-hydroxy-3-sulfo-6-amino-naphthalene | black |
| 55 | " | " | (2-hydroxy-3-sulfo-5-nitrophenyl)azo-(2-hydroxy-5-tert-butylphenyl) | reddish brown |

-continued

| No. | I | II | III | IV |
|---|---|---|---|---|
| 56 | SO₃H, benzene with NH-CO-CH₂-CO-CH₃ (ortho) and NH-CO-CH₂-CO-CH₃ (para) | 2-amino-4-nitrophenol (OH, NH₂, NO₂) | naphthalene with OH, SO₃H, NO₂ azo-coupled to 2-naphthol (OH) | olive brown |
| 57 | " | " | HO₃S, OH-naphthalene with NO₂ azo-coupled to 2-naphthol (OH) | brown |
| 58 | " | " | OH-nitrophenyl azo-coupled to aminonaphthalene-SO₃H (NH₂, SO₃H) | olive |
| 59 | " | " | HO₃S, OH, NO₂-phenyl azo-coupled to pyrazolone (C-OH, N-phenyl, CH₃) | orange |
| 60 | " | " | HO₃S, OH, NO₂-phenyl N=CH salicylaldehyde (OH) | orange-yellow |
| 61 | " | HO₃S, OH, NH₂, NO₂ benzene | " | orange-yellow |
| 62 | " | " | OH, NO₂-phenyl azo-coupled to OH, C₄H₉t-phenyl | brown |
| 63 | " | 2-amino-4-nitrophenol (OH, NH₂, NO₂) | O₂N, OH-phenyl azo-coupled to OH-naphthalene-SO₃H | olive-tinged brown |

| No. | I | II | III | IV |
|---|---|---|---|---|
| 64 | " | " | (structure: HO₃S, OH, NO₂ phenyl –N=N– OH, C₅H₁₁t phenyl) | brown |
| 65 | " | " | (structure: HO₃S-naphthyl-OH –N=N– OH-naphthyl) | brownish olive |
| 66 | " | " | (structure: HO₃S, OH, NO₂ naphthyl –N=N– OH, SO₃H, NH₂ naphthyl) | olive |
| 67 | " | " | (structure: HO₃S, OH, NO₂ phenyl –N=N– OH, SO₃H, NH₂ naphthyl) | olive-black |
| 68 | " | " | (structure: HO₃S, OH, NO₂ phenyl –N=N– OH, C₄H₉t phenyl) | brown |
| 69 | NH–CH₂–CH₂–NH, CO, CH₂, CO, CH₃ (bis-acetoacetyl ethylenediamine) | " | (structure: HO₃S, OH, NO₂ naphthyl –N=N– OH naphthyl) | very dark olive |
| 70 | NH–CO–CH₂–CO–CH₃, CH₂, CH₂, CH₂, NH–CO–CH₂–CO–CH₃ | " | " | very dark olive |
| 71 | " | " | (structure: HO₃S, OH, NO₂ phenyl –N=N– OH, C₄H₉t phenyl) | brown |

-continued

| No. | I | II | III | IV |
|---|---|---|---|---|
| 72 | " | " | [structure: HO₃S, OH, NO₂ substituted phenyl-N=N-naphthol with OH] | brown |
| 73 | NH—CO—CH₂—CO—CH₃<br>\|<br>CH₂<br>\|<br>CH₂<br>\|<br>NH—CO—CH₂—CO—CH₃ | " | " | brown |
| 74 | " | " | [structure: O₂N, OH, SO₃H substituted phenyl-N=N-naphthol with OH] | brown-black |
| 75 | " | " | [structure: OH, NO₂ substituted phenyl-N=N-naphthalene with NH₂ and SO₃H] | olive |
| 76 | " | " | [pyrazolone structure with HO₃S, OH, NO₂ substituted phenyl azo coupling, N-phenyl, CH₃] | orange |
| 77 | " | " | [structure: OH, HO₃S, NO₂ substituted naphthyl-N=N-naphthyl with OH, SO₃H, NH₂] | greenish-black |
| 78 | " | " | [structure: HO₃S, OH, NO₂ substituted phenyl-N=N-C(OH)=C(CH₃) with CO—NH—phenyl] | yellow |
| 79 | " | [COOH, NH₂ substituted benzene (anthranilic acid)] | [pyrazolone structure with COOH substituted phenyl azo, N-phenyl-SO₃H, CH₃] | yellow |

-continued

| No. | I | II | III | IV |
|---|---|---|---|---|
| 80 | " | " | (structure with COOH-phenyl-N=N-C, pyrazolone ring with CH3, C=N, C-OH, N-phenyl-SO3H) | yellow |
| 81 | " | O2N, OH, NH2, SO3H substituted benzene | HO3S, OH naphthalene—N=N—OH naphthalene with NO2 | greyish-brown |
| 82 | " | " | HO3S, OH, NO2 benzene—N=N—OH naphthalene | brown |
| 83 | " | " | O2N, OH, SO3H benzene—N=N—OH naphthalene | greyish brown |
| 84 | " | " | OH, O2N benzene—N=N—naphthalene with NH2 and SO3H | greenish olive |
| 85 | " | " | HO3S, OH, NO2 benzene—N=N—pyrazolone (CH3, C=N, C-OH, N-phenyl) | orange |
| 86 | " | " | HO3S, OH, NO2 naphthalene—N=N—OH naphthalene with SO3H and NH2 | greyish black |

-continued

| No. | I | II | III | IV |
|---|---|---|---|---|
| 87 | " | " | [structure: 3-nitro-6-sulfo-2-hydroxyphenyl–N=N–1-hydroxy-2-sulfo-6-amino-naphthyl] | grey-ish-brown |
| 88 | " | " | [structure: 2-hydroxy-4-sulfo-naphthyl–N=N–2-hydroxy-naphthyl] | dark brown |
| 89 | " | " | [structure: 2-hydroxy-5-chlorophenyl–N=N–2-hydroxy-naphthyl] | violet-tinged dark brown |
| 90 | " | " | [structure: 2-hydroxy-5-nitrophenyl–N=N–2-hydroxy-naphthyl] | brown |
| 91 | " | " | [structure: 2-hydroxy-5-nitrophenyl–N=N–2-hydroxy-5-tert-butyl-phenyl] | brown |
| 92 | " | " | [structure: 2-hydroxy-3-sulfo-5-nitrophenyl–N=N–2-hydroxy-5-tert-butyl-phenyl] | brown |
| 93 | " | " | [structure: 2-hydroxy-5-sulfo-phenyl–N=N–2-hydroxy-naphthyl] | violet-tinged-brown |
| 94 | " | [structure: 2-hydroxy-3-amino-5-sulfo-phenyl (OH, NH₂, SO₃H)] | [structure: 2-hydroxy-3-sulfo-5-nitrophenyl–N=N–pyrazolone with phenyl and CH₃] | orange |

-continued

| No. | I | II | III | IV |
|---|---|---|---|---|
| 95 | (structure: piperazine with two CO-CH₂-CO-CH₃ groups on N) | (structure: HO₃S, OH, NH₂, NO₂ substituted benzene) | (structure with OH, N, azo, OH, NO₂, CH₃, SO₃H) | orange |
| 96 | " | " | (structure with HO₃S, OH, azo, NO₂, OH, N, CH₃) | orange |
| 97 | (structure: 1,3,4-thiadiazole with two NH-CO-CH₂-CO-CH₃ groups) | " | " | orange |
| 98 | " | " | (structure with OH, N, azo, OH, NO₂, CH₃, SO₃H) | orange |
| 99 | (biphenyl with two NH-CO-CH₂-CO-CH₃ groups) | " | (structure with HO₃S, OH, azo, NO₂, OH, N, CH₃) | orange |
| 100 | " | " | (structure with OH, N, azo, OH, NO₂, CH₃, SO₃H) | orange |
| 101 | (ethylene bridge with two NH-CO-CH₂-CO-CH₃ groups) | " | (structure with HO₃S, OH, azo, NO₂, OH, N, CH₃) | orange |

-continued

| No. | I | II | III | IV |
|---|---|---|---|---|
| 102 | " | " | 2-hydroxy-3-nitro-5-sulfo-phenyl azo 2-hydroxynaphthyl | olive |
| 103 | " | " | 2-hydroxy-6-sulfo-naphthyl azo 2-hydroxynaphthyl | olive |
| 104 | " | " | 2-hydroxy-3-sulfo-5-nitro-phenyl azo 1-hydroxy-6-amino-3-sulfo-naphthyl | olive |
| 105 | " | " | 2-hydroxy-6-sulfo-4-nitro-naphthyl azo 1-hydroxy-3-sulfo-6-amino-naphthyl | greenish-olive |
| 106 | " | " | 2-hydroxy-3-sulfo-5-nitro-phenyl azo 2-hydroxynaphthyl | brownish-olive |
| 107 | " | " | 2-hydroxy-6-sulfo-3-nitro-naphthyl azo 2-hydroxynaphthyl | olive |
| 108 | " | " | 2-hydroxy-5-nitro-phenyl azo 2-hydroxynaphthyl | brown |
| 109 | " | " | 2-hydroxy-5-nitro-phenyl azo 2-hydroxy-4-tert-butyl-phenyl | brown |

| No. | I | II | III | IV |
|---|---|---|---|---|
| 110 | " | " | 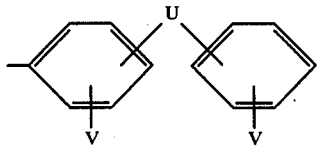 | brown |

DYEING INSTRUCTIONS FOR LEATHER 100 parts of suede leather for clothing (dry weight) are wetted back at 50° in a solution of 1000 parts by volume of water and 2 parts of 24% ammonia for 2 hours, and subsequently dyed at 60° in a solution of 1000 parts by volume of water, 2 parts of 24% ammonia and 6 parts of the dye from Example 3 for 1 hour. There is then added a solution of 40 parts by volume of water and 4 parts of 85% formic acid, and dyeing is performed for a further 30 minutes. The leather is subsequently well rinsed, and optionally further treated with 2 parts of a dicyandiamide/formaldehyde condensation product at 50° for 30 minutes.

Other suede leathers and also glove leathers can be treated in the same manner.

The brown dyeings thus obtained are characterised by generally good fastness properties and a very good covering capacity.

What is claimed is:

1. A chrome-complex dye which, in the form of the free acid, corresponds to the formula

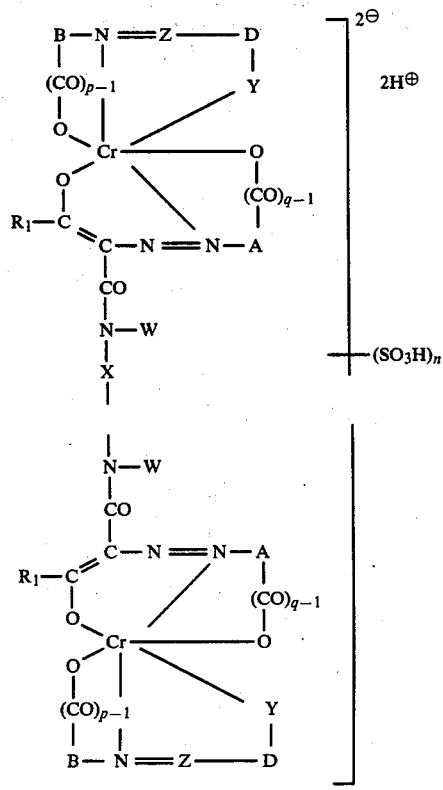

wherein X is a direct bond or the radical of an aliphatic or aromatic diamine, W is hydrogen or a lower alkyl group, or the two W's taken together are an aliphatic bridge having 2 C atoms, each $R_1$ is a low-molecular alkyl group, an aryl group or the $CN-CH_2$ group, the A's independently of one another are each a radical of the benzene or naphthalene series, the B's independently of one another are each a radical of the benzene or naphthalene series, the Z's independently of one another are each a nitrogen atom or a CH group, the p's independently of one another are each 1 or 2, the q's independently of one another are each 1 or 2, the Y's independently of one another are each an oxygen atom or a group of the formula —NR—, wherein R is hydrogen or low-molecular alkyl, and when Z is a CH group, Y has to be an oxygen atom and the D's independently of one another are each the radical of an o-hydroxyaldehyde, or, when Z is a nitrogen atom, they are each the radical of a coupling component coupling in the o-position with respect to Y, and n is an integer from 1 to 8 inclusive.

2. A chrome-complex dye of claim 1, wherein Z is a nitrogen atom; and when Y is —NR—, R is hydrogen.

3. A chrome-complex dye of claim 2, wherein D—Y is the radical of phenol, naphthol, naphthylamine, pyrazolone, pyrazoleimine, pyridone or acetoacetic acid amide.

4. A chrome complex-dye of claim 1, wherein each $R_1$ is methyl.

5. A chrome-complex dye of claim 1, wherein X is an alkylene having 2 to 6 C atoms, a phenylene group, a naphthylene group or a group of the formula wherein U is a direct bond, an unsubstituted or substituted methylene bridge, or a bridge of the formula —O—, —S—, —NR'—, —SO—, —SO$_2$—, —CO—, —CO—CO—, —CO—NH—, —NH—CO—NH—, —NH—CS—NH—, —SO$_2$—NH—, —SO$_2$—NH—SO$_2$—, —N=N—, —CH$_2$CH$_2$— or —CH=CH—, wherein R' is hydrogen or low-molecular alkyl, and the V's independently of one another are each hydrogen, sulfo, carboxy, halo, low molecular alkyl or low molecular alkoxy.

6. A chrome-complex dye of claim 1 wherein X is a low-molecular alkylene group, a phenylene or naphthylene group which is unsubstituted or substituted by chlorine, nitro, sulfo, low-molecular alkyl or low-molecular alkoxy, or X is a radical of the formula

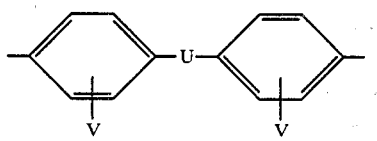

wherein U is a direct bond or a bridge member of the formula

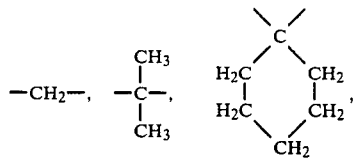

—CH=CH—, —SO$_2$—, —O— or —SO$_2$—NH—SO$_2$—, and the V's independently of one another are each hydrogen, sulfo, chloro, methyl or methoxy, R is hydrogen, A and B independently of one another are each a phenyl or naphthyl group which is unsubstituted or substituted by sulfo, alkyl, alkoxy chloro, nitro or cyano, and the D's independently of one another are each a phenyl group which is unsubstituted or substituted by hydroxyl, alkyl or alkoxy, or are each a naphthyl group which is unsubstituted or substituted by amino, acylamino or sulfo, or are each the radical of a 1-aryl-3-methylpyrazol-5-one, or the radical of an acetoacetic acid anilide, the two last-mentioned radicals being able to be substituted by sulfo, nitro, chlorine, bromine, alkyl or alkoxy.

7. A chrome-complex dye of claim 6, wherein X is phenylene which is unsubstituted or substituted by sulfo, methyl or methoxy, or X is a radical of the formula

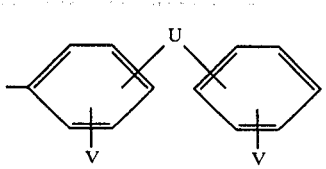

wherein each V is hydrogen or a sulfo group, and U is a direct bond, or a bridge member of the formula —CH$_2$—, —C(CH$_3$)$_2$—,

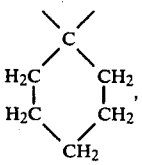

—CH=CH—, —SO$_2$—, —O— or —SO$_2$—NH—SO$_2$.

8. A chrome-complex dye according to claim 6, wherein A and B independently of one another are each phenyl or naphthyl each substituted by nitro or sulfo or by nitro and sulfo.

9. A chrome-complex dye according to claim 6, wherein D is a naphthyl group which is unsubstituted or substituted by sulfo or by amino and sulfo, or it is a phenyl group which is unsubstituted or substituted by low-molecular alkyl, or it is the radical or a 1-phenyl-3-methyl-pyrazol-5-one which is unsubstituted or substituted in the phenyl nucleus by sulfo.

10. A chrome-complex dye of any one of claims 1 to 9, which contains 2 to 6 sulfo groups.

* * * * *